UNITED STATES PATENT OFFICE.

ALEXANDER CLASSEN, OF AIX-LA-CHAPELLE, GERMANY.

IODIN DERIVATIVES OF AROMATIC AMINS AND PROCESS OF MAKING SAME.

SPECIFICATION forming part of Letters Patent No. 627,982, dated July 4, 1899.

Application filed November 26, 1895. Serial No. 570,188. (No specimens.)

*To all whom it may concern:*

Be it known that I, ALEXANDER CLASSEN, professor and doctor of philosophy, a subject of the King of Prussia, German Emperor, residing at Aix-la-Chapelle, in the Kingdom of Prussia, Germany, have invented new and useful Improvements in Processes of Manufacturing Iodin Derivatives of Aromatic Amins, (for which I have received Letters Patent in Germany, Nos. 81,928 and 81,929, dated May 27, 1894,) of which the following is a specification.

Antiseptically-acting iodin derivatives of secondary aromatic amins, in particular of diphenylamin and its derivatives, including its tertiary amins have hitherto not yet been known, or I have found that by the action of iodin upon such aromatic amins in the presence of a medium that will absorb the hydroiodic acid iodin products can be obtained that distinguish themselves by their excellent antiseptic properties and possess, as compared with other iodin preparations, the advantage of complete absence of odor and capability of crystallization. The new bodies shall be used as a substitute for iodoform. In the manufacture mercury oxid has shown to be of great advantage as an absorbent for the iodid of hydrogen; but other media can be employed if only they have the property of binding or decomposing the iodid of hydrogen developed in the reaction. The same antiseptic action as that shown by the iodin compounds thus prepared are also shown by the acid derivatives produced by the action of various reagents—for example, acid chlorids, acid anhydrids, &c., as also the nitroso compounds of these iodin products.

The following examples will serve to exemplify the process:

1. *Di-iodo carbazol.*—Fifty grams carbazol are boiled together with two hundred grams yellow mercury oxid and two hundred grams powdered iodin in two liters of alcohol for three hours with a reflux-cooler. The boiling solution is filtered while hot and the filtrate is poured into two liters of cold water, in which two hundred grams potassium iodid are dissolved for preventing a separation of mercury iodid. The light-yellow reaction product, which at once separates, is drawn off and washed with warm water until the filtrate does not show any more iodin or mercury reaction. It is thus obtained at once in a pure state, but amorphous. It is obtained in crystalline form from hot alcohol, a hot glacial acetic acid in yellow laminæ, of a melting-point of 184° centigrade. The di-iodo carbazol is insoluble in water, easily soluble in benzene and ether, and also in hot alcohol, chloroform, and glacial acetic acid. When heated by itself or with sulfuric or nitric acid, it gives off iodin. It is not affected by cold alkalies or cold acids. Compared with all the other hitherto-produced iodin compounds suitable for use for pharmaceutical purposes this body, as well as all the following ones, are perfectly odorless. The body has the formula:

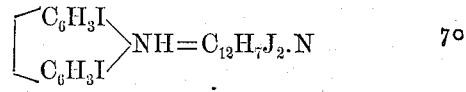

Calculated:

C=34.45%. H=1.67%. N=3.35%. I=60.53%.

Found:

C=34.20%. H=2.11%. N=3.53%. I=60.47%.

2. *Di-iodo diphenylamin.*—Fifty grams diphenylamin and two hundred grams mercury oxid are kept boiling in two liters alcohol with two hundred and fifty grams iodin for two hours with a reflux-cooler. To the hot filtered solution there is at once added a solution of two hundred grams potassium iodid in two hundred liters of water and the dark-gray crystalline precipitate is filtered. By dissolving in alcohol, boiling with blood charcoal, and precipitation with water it is obtained in strongly-lustrous laminæ, which on repeated treatment with blood charcoal are as clear and transparent as glass. The melting-point is about 129° centigrade. Di-iodo diphenylamin is insoluble in water and easily soluble in all organic solvents. It is not affected by dilute acids and alkalies. On boiling with sulfuric acid or nitric acid iodin is liberated, also on heating in capillary tubes at 200° centigrade. The di-iodo diphenylamin is quite odorless, not poisonous, and possesses strong antiseptic properties. This body has the formula:

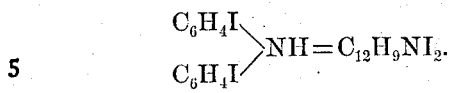

Calculated:  Found:
I = 60.24%.  I = 60.4 %.
N = 3.33%.   N = 3.45%.

*Di-iodo nitrosodiphenylamin.* — Thirty grams di-iodid of diphenylamin are dissolved in five hundred grams of absolute alcohol, and sixty cubic centimeters fuming hydrochloric acid (specific gravity 1.19) are added. The solution is cooled with ice, and a cooled solution of sixty grams sodium nitrite in one hundred grams water is poured in. The reaction product, which at once separates, is filtered after the addition of a little ice-water. The precipitate is washed with a little alcohol and is recrystallized from absolute alcohol with blood charcoal. It forms long narrow yellow laminæ of the melting-point of from 119° to 120° centigrade. It is easily soluble in all hot organic solvents, with difficulty in the cold, insoluble in water, is decomposed by strong acids with separation of nitrous acid and iodin, also on heating on platinum. It is absolutely odorless. The analyses correspond to the composition:

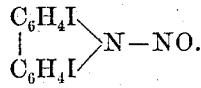

Calculated:  Found:
I = 56.79%.  I = 56.49%.
N = 6.23%.   N = 6.18%.

The body can also be readily produced by boiling in a benzene solution of di-iodo of diphenylamin with amyl-nitrite.

*Acetyldi-iodo diphenylamin.* — Thirty grams di-iodo diphenylamin are boiled in a benzene solution with some excess of acetylchlorid with a reflux-cooler until completion of the development of hydrochloric acid—about six hours. The clear solution is evaporated for the removal of the benzene and is digested with warm water for the decomposition of the excess of acetylchlorid, from which the reaction product can be separated by shaking with a considerable quantity of ether. After removal of the latter the acetyl body is recrystallized from dilute alcohol with the addition of blood charcoal. It is thus obtained in fine lustrous colorless laminæ, having the melting-point of 138° centigrade. It is very readily soluble in all organic solvents under heat, rather less so in the cold, and on boiling with strong acids and heated on platinum it gives off iodin. It is also perfectly odorless.

Analysis calculated for $(C_6H_4I)_2N.C.O.CH_3$:
I = 55.19%.
Found:   55.25%.

In exactly the same manner as the acetyl body is produced the benzoyldi-iodo-diphenylamin, the only difference being that for the decomposition of traces of excess of benzoylchlorid there is employed, in place of hot water, hot soda-lye for maintaining the benzoic acid formed in solution.

The benzoyl body is filtered and is recrystallized from dilute alcohol. It gives colorless laminæ with melting-point of 156° to 157° centigrade. The properties and solubility are exactly the same as with the acetyl body. It is also perfectly odorless.

Formula: $(C_6H_4I)_2NCOC_6H_5 = C_{19}H_3I_2NO$.
Calculated: I = 48.28%.
Found:   I = 48.31%.

In an analogous manner to that above described the iodin products are produced from other aromatic amins.

In place of free iodin, iodin salts—for instance, potassium iodid—can be used with the addition of a medium for setting free the iodin, also iodin chlorid hydrochloric acid and similarly-operating substances.

I claim—

1. The herein-described process for manufacturing iodin antiseptic products, consisting in treating a secondary aromatic amin with an iodating agent, and absorbing the hydroiodic acid formed in the reaction.

2. The herein-described process for manufacturing iodin antiseptic products, consisting in treating a diphenylamin with iodin, and absorbing the hydroiodic acid formed in the reaction with mercury oxid.

3. The herein-described process for manufacturing iodin antiseptic products consisting in treating a secondary aromatic amin with an iodating agent, absorbing the hydroiodic acid formed in the reaction, and combining the resulting product with a substance adapted to form a derivative containing the iodin atoms in the nucleus.

4. The herein-described process for manufacturing iodin antiseptic products consisting in treating diphenylamin with iodin, absorbing the hydroiodic acid formed in the reaction with mercury oxid, and combining the resulting product with acetyl chlorid.

5. The herein-described odorless iodin compounds possessing excellent antiseptic properties, derived from the secondary amins by reaction with iodin, being insoluble in water, soluble in organic solvents, non-poisonous, crystallizing in laminæ, and having the general formula:

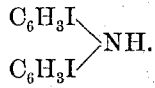

In testimony whereof I have signed my name to this specification in the presence of two subscribing witnesses.

ALEXANDER CLASSEN.

Witnesses:
JOHN HECKMANNS,
W. C. EMMET.